May 24, 1949.  J. R. ENGARD ET AL  2,470,810
BELT-APPLYING TOOL
Filed Feb. 17, 1948
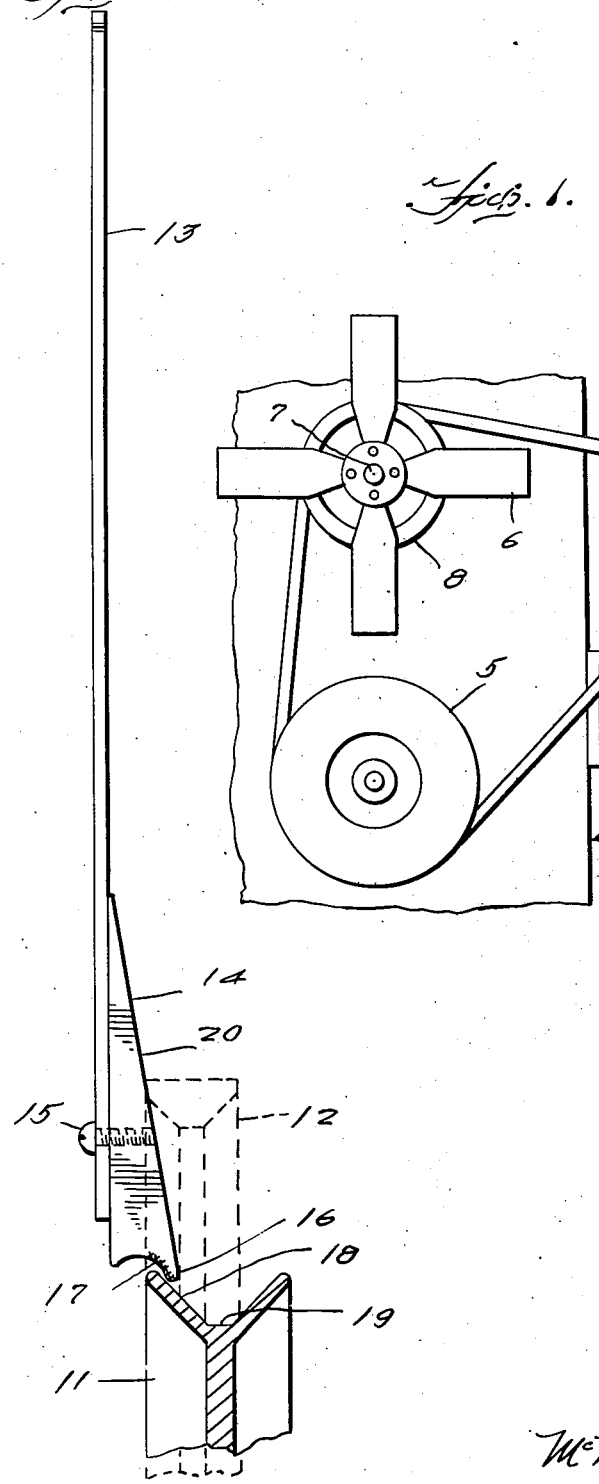
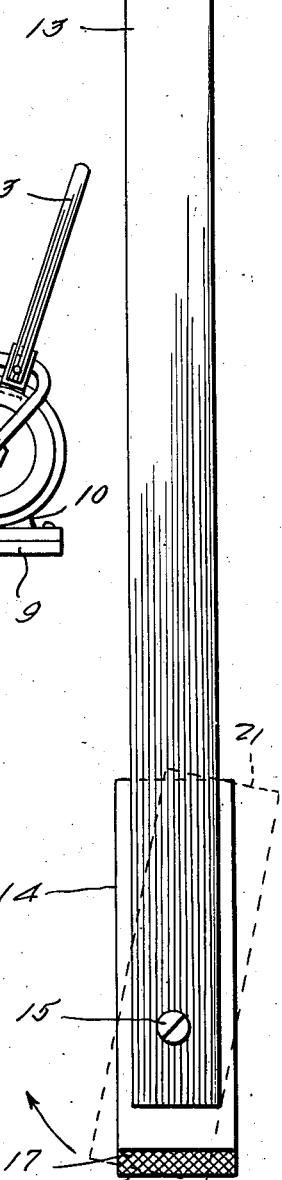
INVENTORS
Albert L. Engard
BY John R. Engard
McMorrow, Berman & Davidson
ATTORNEYS Patented May 24, 1949

2,470,810

UNITED STATES PATENT OFFICE 2,470,810

BELT-APPLYING TOOL

John R. Engard and Albert L. Engard, Hazleton, Pa.

Application February 17, 1948, Serial No. 8,764

2 Claims. (Cl. 74—242.7)

The present invention relates to belt-applying tools for installing belts on grooved pulleys, and particularly for applying a fan belt or other belt upon the engine and fan pulleys, etc., on an automobile and the like.

The main object of the invention is to provide a belt-applying tool of the character indicated for quickly and conveniently applying a round or V-shaped belt into proper driving position upon a plurality of grooved pulleys at will.

Another object is to have such a tool which has a projecting belt-shifting toe portion for engaging one of the inner sides of a pulley upon which the belt is to be engaged.

A further object is to have such a tool provided with a pivotally-mounted, projecting, belt-shifting toe portion adapted for introduction upon one side of the groove of the pulley to be engaged by the belt.

It is above all an important object of the invention to provide facilities for insuring the safety of the operator using the tool to place the belt on the pulleys.

It is likewise an object to provide the mentioned type of tool in simple, yet effective, construction while being reasonable in cost.

Other objects and advantages will appear in further detail as the specification proceeds.

In order to disclose the features of the invention more comprehensively, the same is illustrated in the accompanying drawing forming part hereof, and in which:

Figure 1 is an elevation of a portion of the front end of the engine upon an automobile or truck, showing an engine drive pulley, a fan pulley and an additional pulley, with a fan belt engaging with two of the pulleys and the belt-applying tool embodying the invention disposed in the position of applying the fan belt upon the third pulley;

Figure 2 is an enlarged side elevation of the tool of the invention in substantially the same relation with respect to a belt and pulley as otherwise shown in Figure 1, the pulley being a fragmentary section and the belt merely being indicated by broken lines;

Figure 3 is another elevation of the belt-applying tool when alone.

In the three views, the same reference numerals indicate the same parts.

It is frequently necessary to install or replace fan belts on automobiles and round or V-shaped belts and the like upon grooved pulleys on other machinery, the belts being a more or less tight fit and requiring careful manipulation to engage them properly with the pulley grooves. Sometimes, the fingers or clothes of the operator may be temporarily caught between the belt and the pulley involved. On the other hand, several mechanical makeshifts have heretofore been proposed and resorted to for the present purpose, but as a rule they are neither convenient, satisfactory or safe.

We have found by actual tests that it is feasible to have a simple, direct-acting and yet safe tool for conveniently applying a belt upon grooved pulleys for the first time or replacing such a belt when desired, as will immediately be described.

Hence, in the practice of our invention, and referring now again to the drawing, a portion of the front end of an automobile engine, generally indicated at 4, has a drive pulley 5, a fan 6 mounted on a shaft 7 carrying a fan pulley 8, while upon a bracket 9 fixed upon one side of the engine is mounted a generator 10 or the like having a pulley 11 for driving the same. The three pulleys 5, 8 and 11 are preferably grooved pulleys having V-shaped grooves in which a V-belt 12 is adapted to engage. As shown in Figure 1, the belt 12 is obviously placed by hand in engaging position upon pulleys 5 and 8, but when the belt is to be finally placed in position on pulley 11, a special tool is called upon to effect engagement.

As already intimated, the belt-applying tool specifically embodying the invention includes an elongated, flat handle 13, at one end of which is pivoted a substantially wedge-shaped belt-shifting member 14 by means of a screw or pin 15 extending through both the handle 13 and shifting member 14. The outer end 16 of the latter member is formed into a projecting toe portion which has a concave knurled wedging portion 17 adapted to be introduced upon the inner edge 18 of the groove 19 of pulley 11 when the inclined working face 20 of said shifting member 14 abuts the edge of the belt, as particularly shown in Figure 2. When the tool is held in substantially the illustrated position, the fan is manually turned slowly when the belt in contact with the inclined face 20 of the pulley-engaging member 14 causes the latter to form a temporary connection between the belt and pulley 11 with the knurled concave or grooved portion 17 frictionally engaging the inner edge 18 of this pulley.

As the fan pulley and pulley 5 are thus gradually rotated, belt 12 will naturally also be moved and will thereby cause corresponding slow rotation of pulley 11, turning the wedge member 14 as indicated in broken lines 21 in Figure 3, while the handle 13 is held generally upright by the hand unoccupied by the turning of the fan. Obviously, the belt begins to descend along the inclined face 20 of the wedge-shaped member 14 until it seats properly in groove 19 in said pulley 11, and when a sufficient portion of the belt is thus laid into the groove, the tool may be lifted off and another partial turn of the fan will cause it to fall finally and completely in place.

While the tool handle is shown and described as long and flat and rather thin, it could be round, square or of any other convenient cross-section, and the whole may be made of any suitable metal or alloy, or of any material that will serve the purpose thereof. In size and proportions, the tool may be altered to suit conditions, but Figures 2 and 3 illustrate an approved size of the tool which suffices for most purposes.

Manifestly, variations may be resorted to, and parts and features may be modified or used without others within the scope of the appended claims.

Having now fully described our invention, we claim:

1. A belt-applying tool for applying a belt to a grooved pulley, including an elongated handle member having at one end a pulley-engaging member which is of substantially wedge-shaped form with the cross-section thereof increasing toward its outer end to present an inclined working surface upon the side thereof and at the outer end terminating in a knurled concave or grooved extremity, and a toe portion upon one side of the latter extremity projecting a sufficient distance beyond the other side thereof to increase the length of the inclined working surface over the length of the opposite side of said pulley-engaging member.

2. A manual belt-applying tool for applying a belt to a grooved pulley, including an elongated handle member having at one end an elongated pulley-engaging member relatively shorter than the handle member and pivoted intermediate the ends thereof upon one side of said handle member to swivel on a pivot axis transverse to the longitudinal dimension of the latter handle member, said pulley-engaging member having a projecting concave end extending beyond said one end of the handle member in the same general direction therewith and having a portion at one side of the concave end constituting a wedging toe adapted to engage upon the inside edge of the grooved portion of the pulley upon which the belt is to be applied, while the tool as a whole extends directly radially outward from the periphery of said pulley and at one side of said belt.

JOHN R. ENGARD.
ALBERT L. ENGARD.

REFERENCES CITED

The following references are of record in the file of this patent:

UNITED STATES PATENTS

| Number | Name | Date |
|---|---|---|
| 433,825 | Scheuerle | Aug. 5, 1890 |
| 2,121,129 | Malone | June 21, 1938 |
| 2,333,395 | Smith | Nov. 2, 1943 |

FOREIGN PATENTS

| Number | Country | Date |
|---|---|---|
| 158,068 | Germany | Feb. 4, 1905 |